No. 814,547. PATENTED MAR. 6, 1906.
R. H. KJELLMAN.
AUTOMATIC FIREARM.
APPLICATION FILED AUG. 3, 1905.
8 SHEETS—SHEET 5.
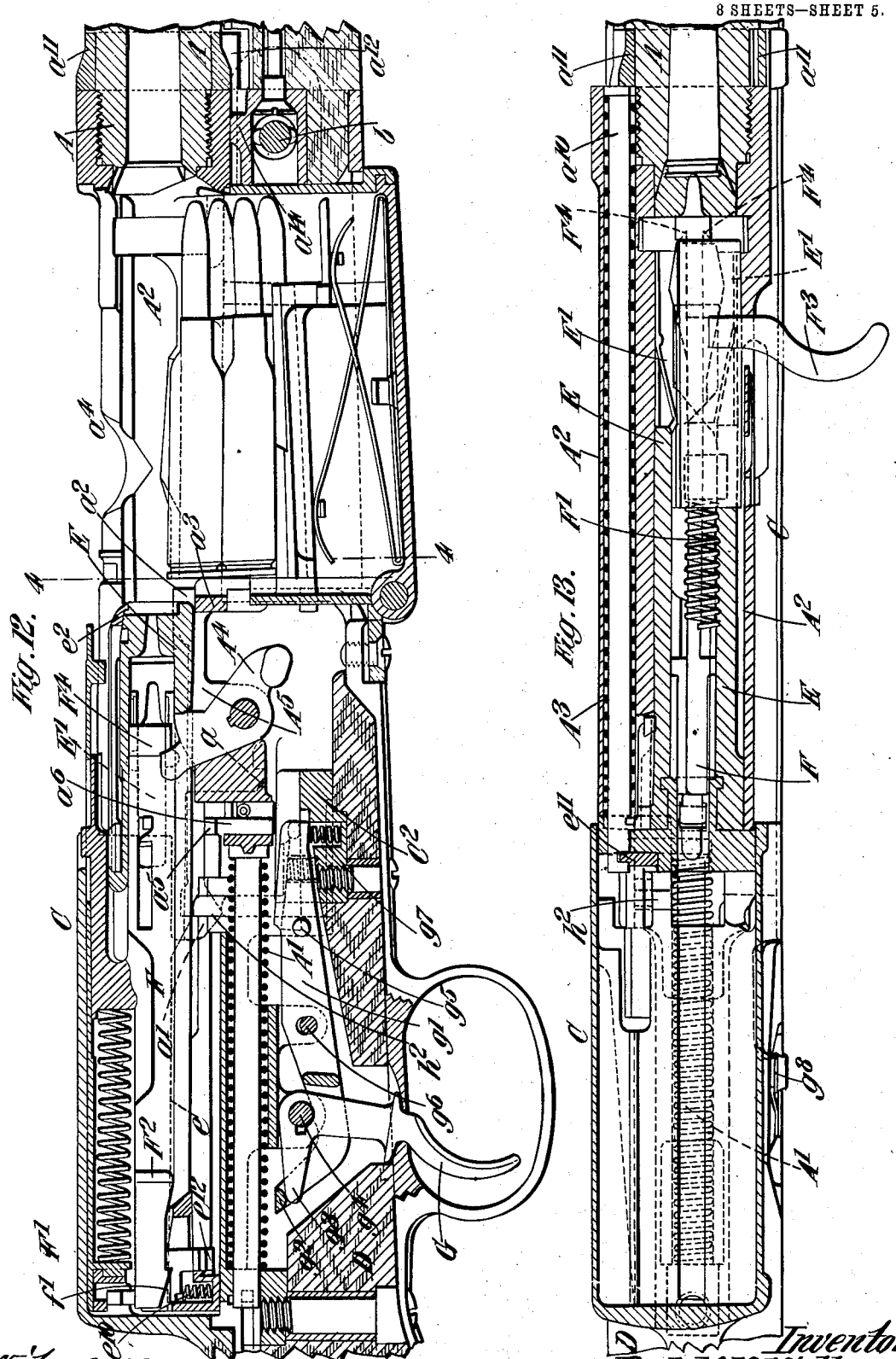

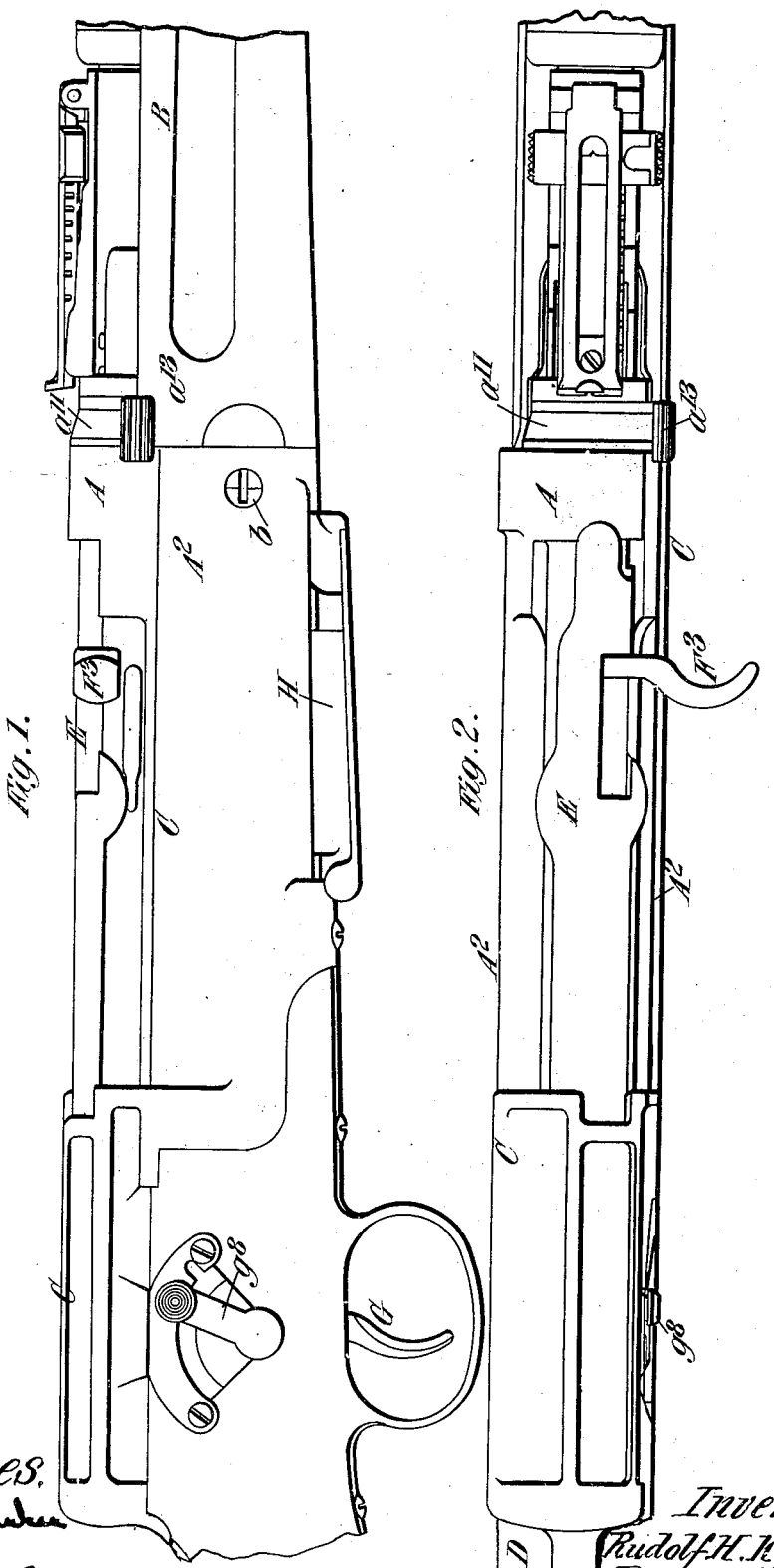

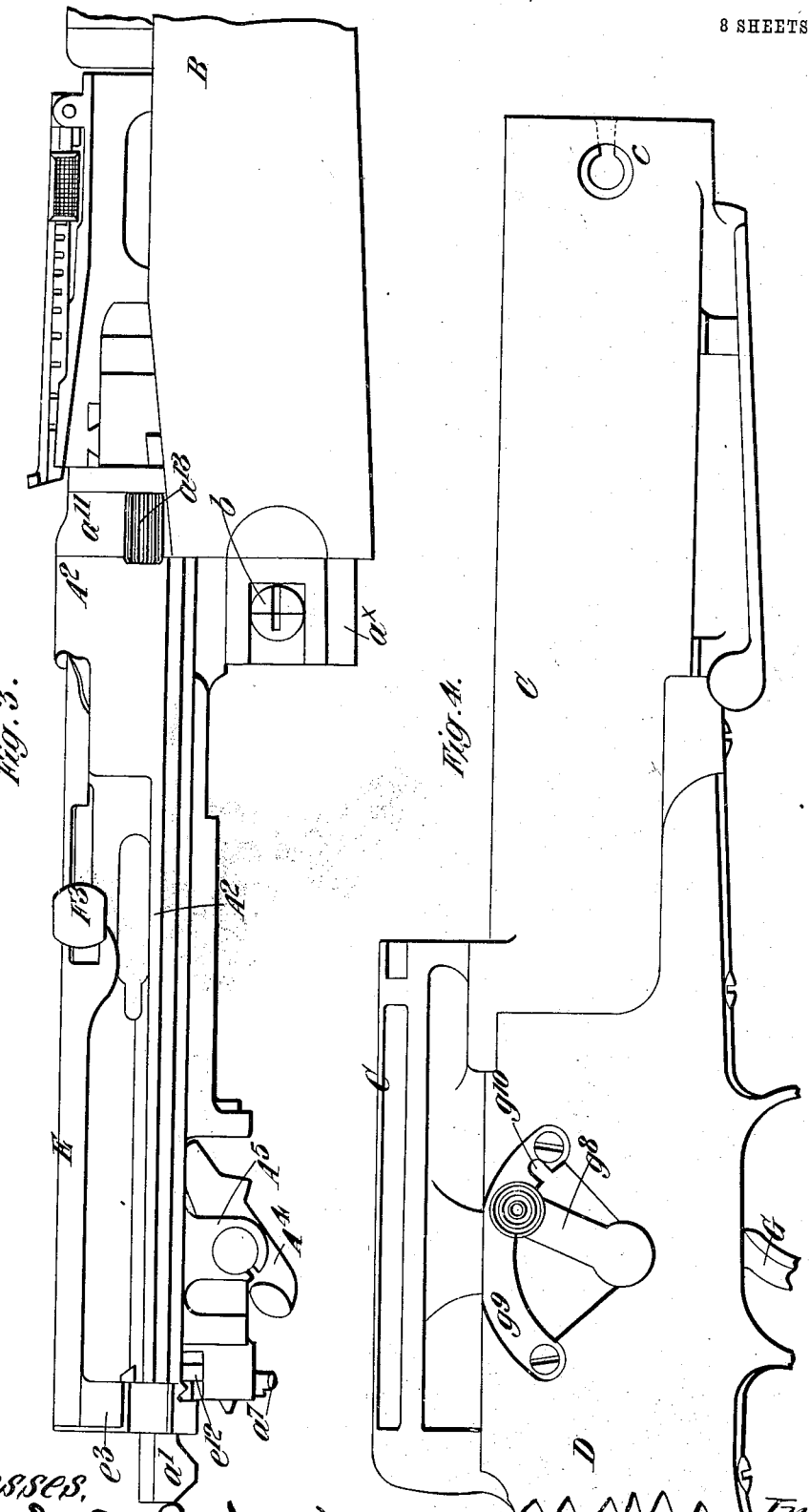

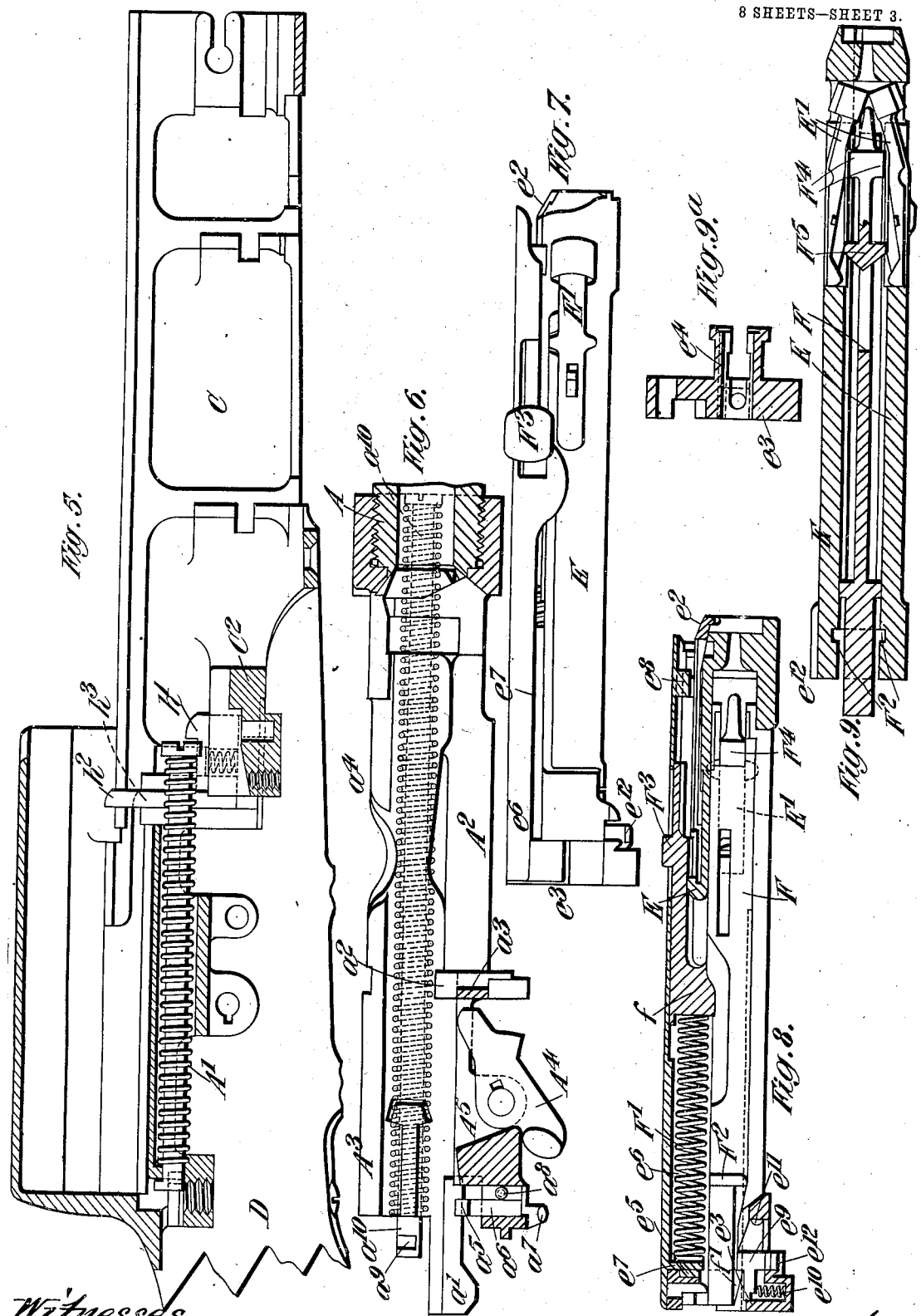

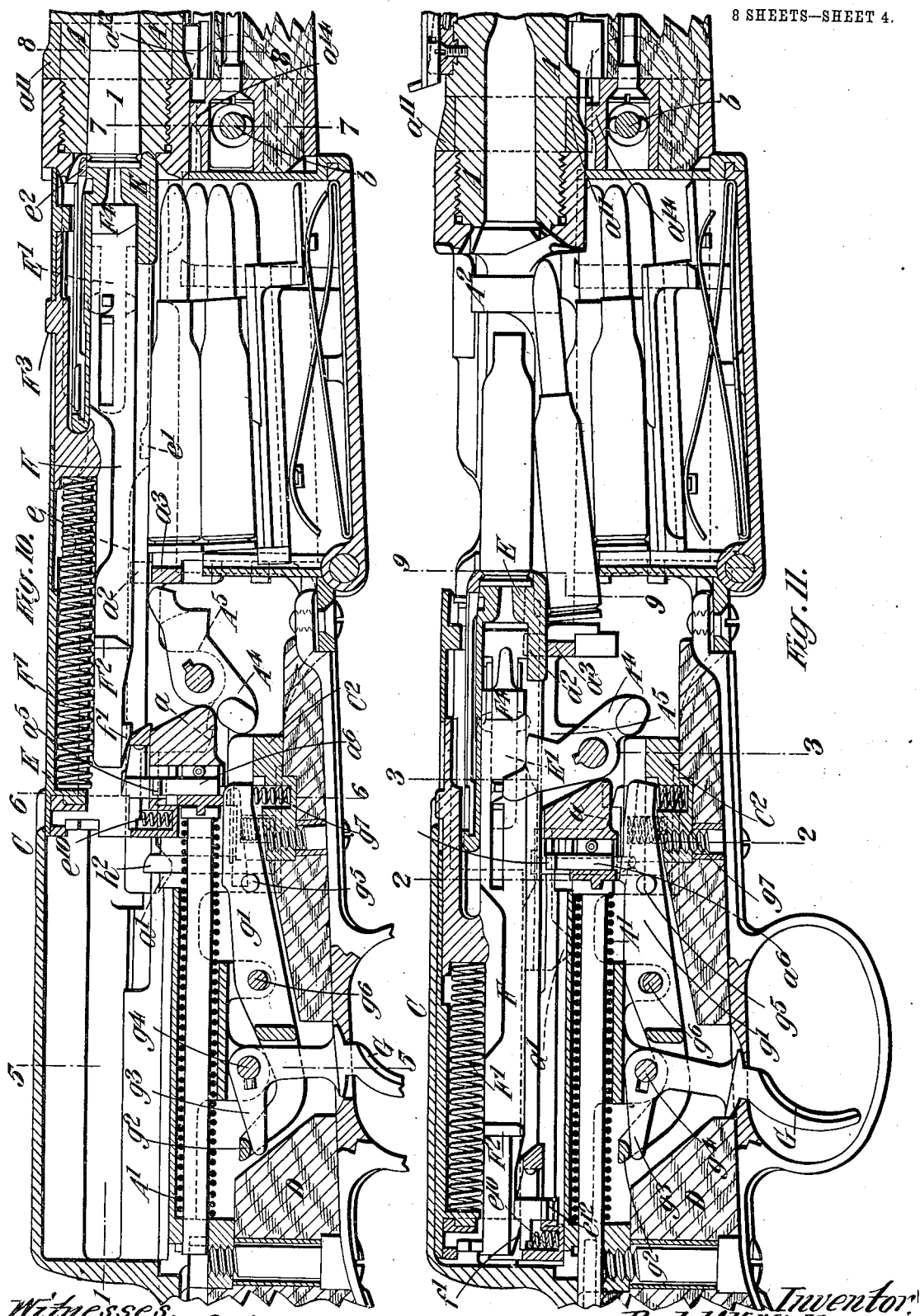

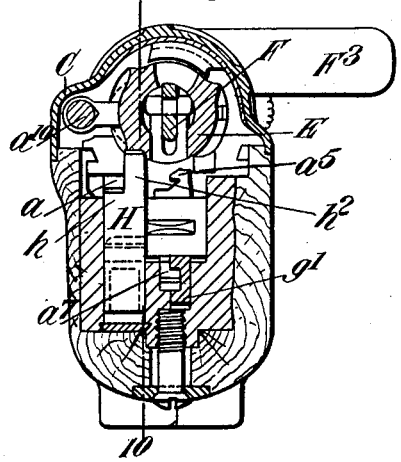
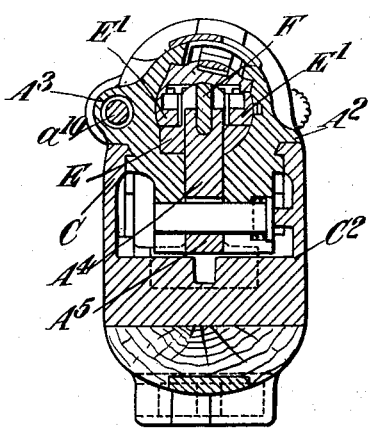
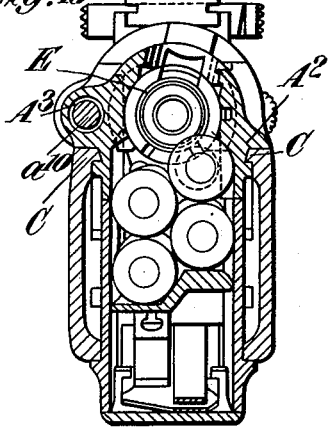
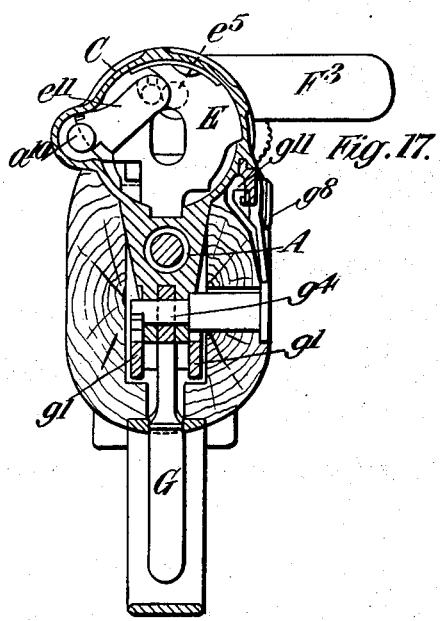
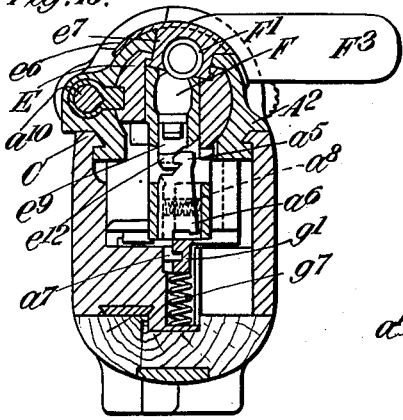
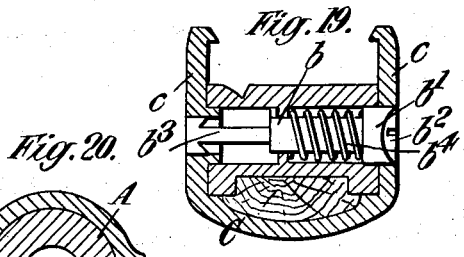
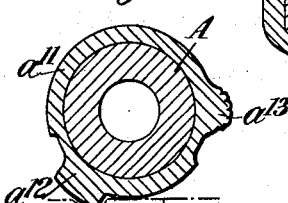

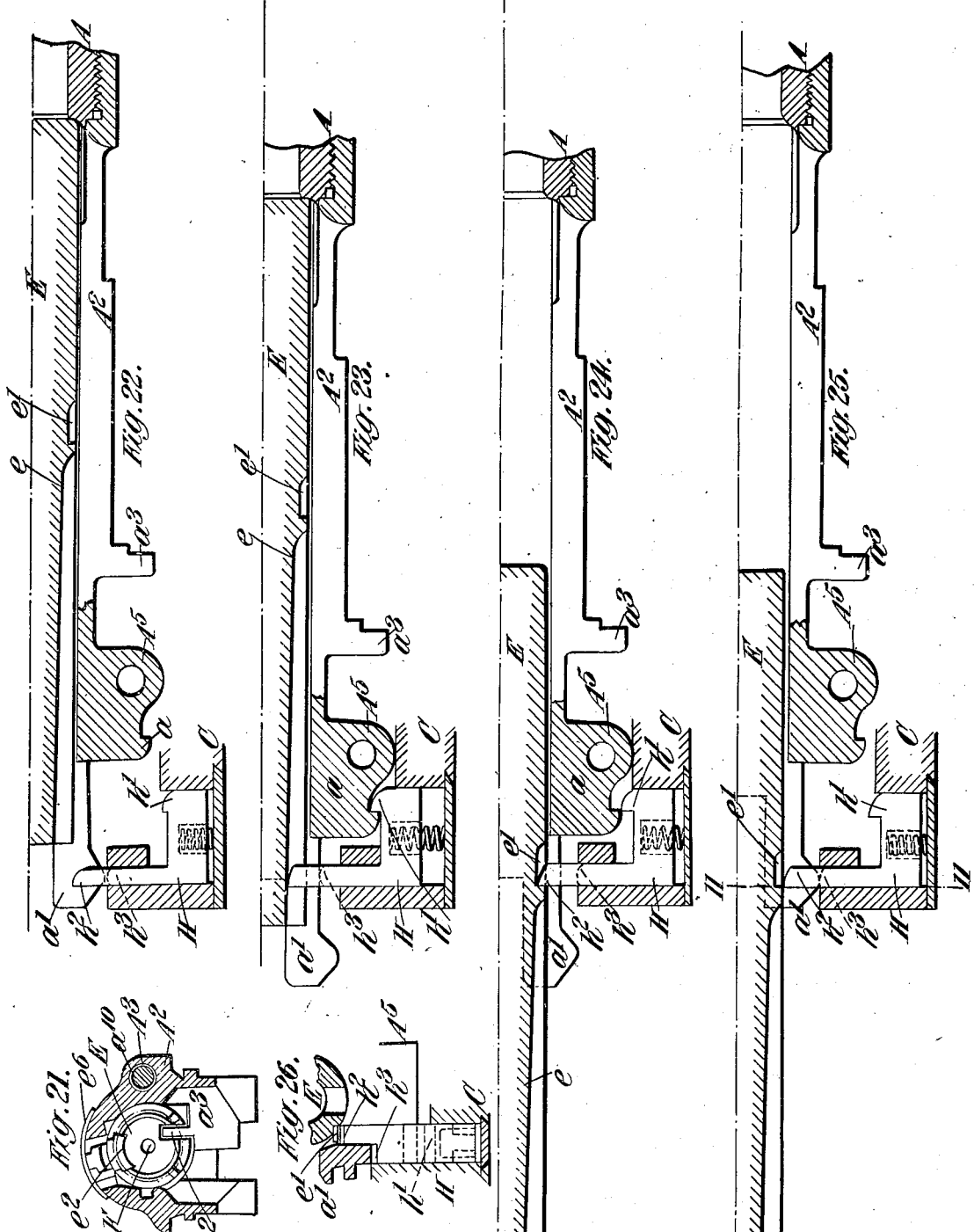

No. 814,547. PATENTED MAR. 6, 1906.
R. H. KJELLMAN.
AUTOMATIC FIREARM.
APPLICATION FILED AUG. 3, 1905.
8 SHEETS—SHEET 8.
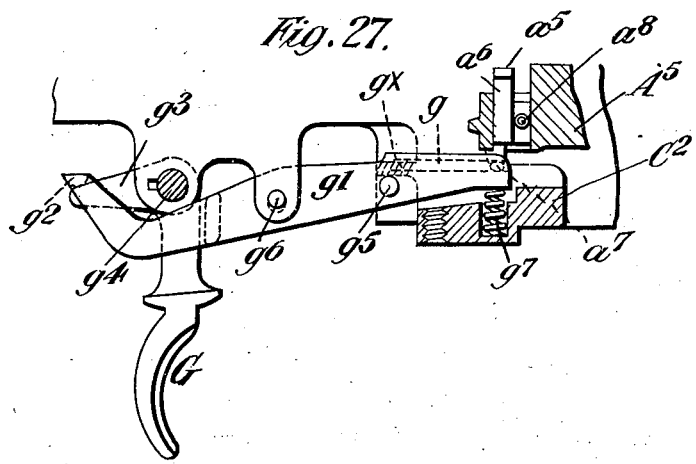
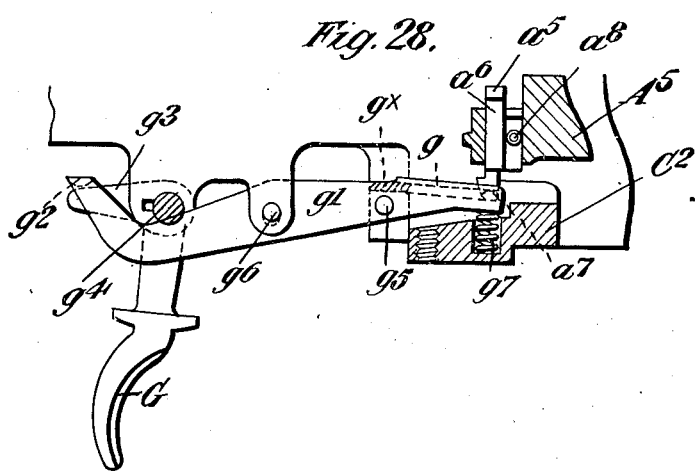
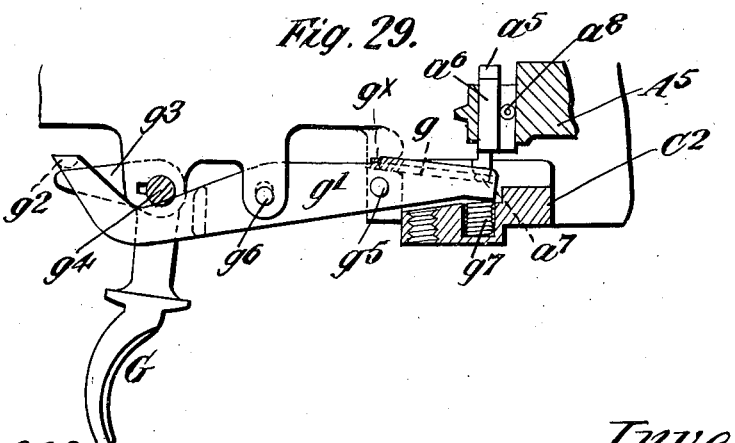
Witnesses.
Frank O. Parker
Robert Everitt,
Inventor,
Rudolf H. Kjellman.
By James W. Norris
Att'y.

UNITED STATES PATENT OFFICE.

RUDOLF HENRIK KJELLMAN, OF STOCKHOLM, SWEDEN, ASSIGNOR TO AKTIEBOLAGET STOCKHOLMS VAPENFABRIK, OF STOCKHOLM, SWEDEN.

AUTOMATIC FIREARM.

No. 814,547.     Specification of Letters Patent.     Patented March 6, 1906.

Application filed August 3, 1905. Serial No. 272,559.

*To all whom it may concern:*

Be it known that I, RUDOLF HENRIK KJELLMAN, engineer, a subject of the King of Sweden and Norway, residing at 37 Handtverkaregatan, Stockholm, in the Kingdom of Sweden, have invented certain new and useful Improvements in and Relating to Automatic Firearms, of which the following is a specification.

This invention relates to automatic firearms, particularly to rifles of the straight-pull type in which the recoil of the barrel provides the necessary energy at each discharge for actuating the breech mechanism and performing the various operations necessary for reloading the gun and rendering it ready for a fresh discharge.

According to this invention the barrel and breech-bolt recoil together for a certain distance against the resistance of the recoil-spring. Then the bolt is unlocked from the barrel and continues its recoil movement (without the barrel) against the resistance of a return-spring, which is restrained from reacting until the bolt has completed its recoil movement and withdrawn the empty cartridge-case. The barrel is then released and the bolt still held retracted. The barrel then advances under the reaction of the recoil-spring and in so doing ejects the extracted cartridge-case. As the barrel approaches the end of its forward movement it liberates the retracted bolt, which then advances to close the breech under the influence of the return-spring, at the same time introducing into the barrel a fresh cartridge which has been previously raised into position in front of the bolt by the action of the cartridge-lifter of the magazine.

The extraction or withdrawal of the empty cartridge-case from the breech-chamber is effected by an ordinary extractor and takes place during the independent rearward movement of the bolt. The ejection of said empty case takes place as the barrel advances to its firing position.

The cartridges are contained within a detachable magazine which is adapted to fit into an opening in the under side of the breech-frame, said cartridges being supplied to the magazine through an opening in the upper side of the breech-frame by means of a clip, as is well understood.

The firing-pin is retained in its cocked position by a sear, which is indirectly connected with the trigger through the intervention of a lever having a double fulcrum. The difference of leverage thus provided enables the "pull off" to be more satisfactorily effected than heretofore.

In order to enable the breech mechanism to be readily reached for inspection, cleaning, or repair, the butt and the stock of the rifle are made separable, the butt carrying the non-recoiling parts and the stock the recoiling parts of the mechanism. The separable butt and stock are locked together by a transverse spring-pin, which can be unlocked by a cartridge-case or other suitable implement.

The firearm can be fired as an ordinary magazine-rifle, if required, a suitable actuating-handle being furnished for this purpose on the breech-block or a part carried thereby. A device may be provided for enabling the amplitude of the recoil movement of the barrel to be reduced when the firearm is being thus used. Suitable means may also be provided for enabling the firearm to work and fire entirely automatically or to work as a single firer, as desired.

In order that the said invention may be clearly understood and readily carried into effect, the same will be described more fully with reference to the accompanying drawings, in which—

Figure 1 is a side elevation, and Fig. 2 a plan, of a rifle constructed in accordance with this invention, a portion of the butt and the stock being broken away. Figs. 3 and 4 are side elevations of the stock and the butt separated from each other. Fig. 5 is a longitudinal central section of the frame or casing which is carried by the butt. Fig. 6 is a longitudinal central section of the breech-frame that forms part of the barrel. Figs. 7, 8, and 9 are respectively a side elevation, a vertical central section, and a horizontal central section, of the breech-bolt. Fig. 9ª is a sectional plan of a detachable end plate with which the breech-bolt is provided, as hereinafter described. Figs. 10, 11, and 12 are vertical sections of the complete breech mechanism with the parts in three different positions, Fig. 10 representing said parts when the rifle has been fired but before recoil, Fig. 11 when the barrel and breech-block have fully recoiled, and Fig. 12 when the barrel has returned to firing position and the breech-bolt is still retracted. Fig. 13 is a horizontal section taken approximately on the line 1 1 of Fig. 10. Figs. 14, 15, 16, 17, and 18 are transverse sections taken, respectively, on the lines 2 2 and 3 3 of Fig. 11, on the line 4 4 of Fig. 12, and on the lines 5 5 and 6 6 of Fig. 10. Fig. 19 is a cross-section taken approximately on the line 7 7 of Fig. 10, showing the transverse spring-pin for detachably connecting the butt to the stock of the rifle. Fig. 20 is a transverse section taken approximately on the line 8 8 of Fig. 10, showing the device employed for enabling the amplitude of the recoil movement of the barrel to be reduced when the firearm is to be used as an ordinary magazine-rifle. Fig. 21 is a transverse section taken approximately on the line 9 9 of Fig. 11, illustrating the cartridge extracting and ejecting device. Figs. 22, 23, 24, and 25 are detail longitudinal sectional views taken approximately on the line 10 10 of Fig. 14, illustrating the parts that coöperate for locking and liberating the barrel and breech-bolt during the working of the rifle, as hereinafter more fully described. Fig. 26 is a transverse section taken approximately on the line 11 11 of Fig. 25. Figs. 27, 28, and 29 are detail views showing the trigger mechanism in the position it assumes before, during, and after the pulling of the trigger.

In all the figures like letters of reference indicate similar parts.

A is the barrel, which is adapted to recoil in the stock B of the rifle against a recoil-spring A' and which has a rearwardly-extending breech-frame $A^2$, suitably guided in grooves or the like formed in a casing C, fixed to the butt D of the said rifle.

E is the breech-bolt, which is adapted to slide in the breech-frame $A^2$ of the barrel and also in the said casing C.

$A^3$ is the spring for returning the breech-bolt to its forward position.

F is the firing-pin or striker, which is carried by the breech-bolt, and F' is the mainspring, which is compressed by the rearward movement of the firing-pin and operates to propel it forward to fire the cartridge.

$A^4$ is the cocking-arm, which is pivotally mounted in a depending lug $A^5$ on the breech-frame of the recoiling barrel. The lower end of said cocking-arm is adapted to strike against a fixed abutment $C^2$ on the floor of the said casing C when the barrel recoils and by turning about its pivot brings its upper end into engagement with lateral projections $F^2$ on the firing-pin and retracts the latter, so as to cock it in the well-known manner. The said firing-pin is also furnished with a lateral handle $F^3$ for enabling the firing-pin and the breech-bolt to be retracted by hand. At its forward end the said breech-bolt carries pivoted lateral locking-levers E' E', having heads for engagement with corresponding recesses in the breech-frame of the barrel for locking said bolt to the barrel when the breech is closed, the said levers being held in their locking position by means of protuberances $F^4$ acting upon said levers as said firing-pin advances to fire the cartridge. The unlocking is effected by lateral protuberances $F^5$ on the firing-pin striking the tails of the locking-levers as the firing-pin is retracted. This mode of locking and unlocking the bolt to and from the barrel forms no part of the present invention.

G is the trigger.

H is a non-recoiling spring-controlled catch (see Figs. 22 to 26) which is mounted on the floor of the casing C and which is furnished with three projections $h'$ $h^2$ $h^3$ so arranged that as the barrel completes its recoil movement, which is comparatively short, a nose $a$ on the under side of the breech-frame of the barrel will become engaged with the projection $h'$, Fig. 23, and be thereby restrained from returning, while the breech-bolt continues its recoil movement under the momentum acquired during the recoil of the barrel. As the breech-bolt completes its independent recoil movement it causes an incline $e$ thereon to operate upon the projection $h^2$ of said catch and to thus depress the latter, thereby disengaging the projection $h'$ from the nose $a$ of the breech-frame, so as to liberate the barrel and permit it to return to the firing position under the reaction of the recoil-spring. Almost simultaneously with this release a notch $e'$ on the bolt becomes engaged with the projection $h^2$, Fig. 24, that was previously depressed by the aforesaid incline $e$ on the bolt, so that then the bolt in turn becomes held retracted while the barrel advances. As the barrel completes its advance movement it brings a double-inclined lug $a'$ on one of the side plates of the breech-frame into contact with the projection $h^3$ of the said catch, Fig. 25, whereby the latter is again depressed, and thus removes the projection $h^2$ from engagement with the notch $e'$ of the breech-bolt. The said bolt is thus liberated and advances under the reaction of the return-spring $A^3$ to close the breech, Fig. 22.

During the independent recoil movement of the breech-bolt the empty cartridge-case is extracted from the barrel by an ordinary extractor-claw $e^2$, which is situated at the upper side of the bolt, the initial or early part of the extraction for loosening the cartridge in the breech-chamber occurring while the breech-bolt is under the influence of the cocking-arm $A^4$. As the barrel advances after being liberated from the projection $h'$ of the spring-controlled catch by the rearward movement of the bolt, as aforesaid, a lug or tooth $a^2$, carried by a cross-piece $a^3$, Figs. 6 and 21, extending transversely across the breech-frame, comes forcibly against the base of the extracted cartridge-case at a point opposite to the extractor, and thus ejects the said case from the breech through the upper opening $a^4$ of the breech-frame.

At the rear of the breech-bolt is a detachable end piece or plate $e^3$, having an extension or socket piece $e^4$, Fig. 9$^a$, provided with vertical guide-ribs for engagement with corresponding grooves in the body of the breech-bolt, the said end plate being retained in place by a rearwardly-extending pin $e^5$ on the cover-plate $e^6$ entering a recess in the said end plate $e^3$. The cover-plate $e^6$ is capable of sliding on the body of the breech-bolt, for which purpose it has at its rear part a hollow web $e^7$, provided with ribs for engaging with corresponding longitudinal grooves in the body of the breech-bolt. It also has at its forward end a projection $e^8$ for engaging with a groove formed in a guide-piece on said body. The mainspring bears at its rear end against the rear end of the said hollow web $e^7$ and at its forward end against a shoulder $f$ on the firing-pin. In order to detach the aforesaid end plate $e^3$, the said cover-plate $e^6$ is slid forwardly a short distance—i. e., far enough for its pin $e^5$ to become disengaged with the said recess—whereupon said end plate can be slid downward out of place. After the said end plate has been detached the cover-plate $e^6$ can be slid rearwardly, together with the firing-pin F and the mainspring F', all of which parts can then be detached.

The socket-piece $e^4$ of the end plate has a cavity at its lower part for the sear $e^9$, which is adapted, by means of a spring $e^{10}$, to engage with a bent $f'$ on the firing-pin when the latter is retracted, and to thus retain it cocked. The sear is in the form of a lever having semicircular shoulders $e^{11}$, engaging with corresponding recesses, about which it can turn. On its under side is a tooth $e^{12}$, with which when the breech-bolt is in its fully-advanced or breech-closing position engages a corresponding tooth $a^5$ at the upper end of a movable intermediate piece $a^6$, mounted in a cavity formed for its reception in the rear part of the depending lug $A^5$, carried by the breech-frame of the barrel. At its lower end this intermediate piece has a lateral tooth $a^7$, Fig. 6, which engages with a recess $g$, formed at the forward end of the lever $g'$ Figs. 27 to 29. This lever has a tailpiece $g^2$, which lies immediately above the free end of a finger $g^3$, forming part of the trigger G, which is pivotally mounted on a transverse pin $g^4$. The said lever $g'$ has, as already stated, double fulcrums—one fulcrum at $g^5$ and the other at $g^6$—and it is normally kept with its forward end pressed in an upward direction by a spring $g^7$. The fulcrum $g^5$ is situated at the forward end of said lever and consists of a lateral pin, which normally bears against a fixed point $g^x$ under the influence of the said spring $g^7$. The other fulcrum $g^6$ is situated near the middle of the lever and consists of a transverse fixed pin, passing through a somewhat elongated hole or segmental slot of the lever. With this arrangement when the trigger is pulled to fire the rifle the said lever $g'$ turns first about its forward fulcrum $g^5$, thus causing the forward end of the lever to move through an arc described about the axis of the fulcrum-pin $g^5$ and the intermediate piece $a^6$ and the sear $e^9$ to be actuated to a small extent during the first part of the lever's movement. When said lever has moved far enough to bring the lower end of its aforesaid elongated hole or segmental slot into contact with the pin $g^6$, the latter becomes the fixed point or fulcrum about which the lever turns, thus enabling the said forward end of the lever to move through an increased arc described about the axis of the fulcrum-pin $g^6$ during the last part of the motion of the said lever in actuating the sear. The difference of leverage thus provided enables the pull off to be more satisfactorily effected than heretofore.

The aforesaid intermediate piece $a^6$ is not only adapted to move vertically in its cavity under the action of the trigger-lever $g'$, but it also participates in a certain amount of lateral motion against the pressure of a light spring $a^8$, so that when the trigger is kept pulled after firing the tooth $a^5$ of said intermediate piece will lie out of the path of the tooth $e^{12}$ of the sear $e^9$, and thus require that the trigger shall be released in order to bring about the reëngagement of the teeth $a^5 e^{12}$ and enable the rifle to be again fired.

The pin $g^4$ is furnished with a radial projection and with an external arm $g^8$, which works over an arc-piece $g^9$ at the side of the rifle-butt. By shifting said arm in a rearward direction the radial projection can be caused to assume a position to prevent the trigger from being pulled, and thus constitutes a safety device. The said arc-piece $g^9$ has a notch $g^{10}$ for a spring-tongue $g^{11}$, Fig. 17, on the back of the arm $g^8$ to get behind the said arc-piece when the parts are being assembled, and thus to retain said arm $g^8$ and pin $g^4$ in place. The position of this notch $g^{10}$ is such that the said spring-tongue cannot be brought opposite thereto unless the screws securing the casing $c$ to the butt are unscrewed to allow the butt to be lowered enough to allow the spring-tongue $g^{11}$ on the arm $g^8$ to pass underneath a small lug on the rear side of the arc-piece $g^9$ and be brought in position opposite the notch $g^{10}$, in which position the arm $g^8$ and the pin $g^4$, connected thereto, can be detached. Unintentional detachment of the said pin $g^4$ is thus avoided.

In order to detach the breech-bolt from the breech-frame, a pivoted latch $e''$, Fig. 17, is provided at the rear end of the bolt. This latch normally engages with a notch $a^9$, Fig.

6, in the piston or plunger $a^{10}$, which is under the influence of the return-spring $A^3$. By shifting said latch outward it can be disengaged from the spring-piston $a^{10}$, and thus permit the breech-bolt to be removed rearwardly from the breech-casing.

The stock B, which carries the barrel and all the other recoiling parts of the rifle, is furnished with the transverse spring-pin $b$, Fig. 19, the opposite ends of which are adapted to engage with corresponding apertures in the U-shaped portion $c$ of the casing C, which (together with the non-recoiling parts of the rifle) is carried by the butt D. One end of the said pin $b$ has a head $b'$ formed with an incline $b^2$, and the other end has a flattened part $b^3$. The spring $b^4$ normally tends to keep the pin with its head $b'$ in an outward position, as shown in Fig. 19. Therefore when the U-shaped portion $c$ of the butt is fitted to the portion $a^x$ of the stock and these parts are pushed together the said pin will first slide inwardly against the resistance of its spring under the pressure of the U-shaped portion acting upon the inclined head $b'$ and will then regain its outward position by the reaction of the spring $b^4$ when the aforesaid apertures come opposite the ends of said pin. The butt and stock will then be locked together, but in such a manner that they can be readily separated when required by merely pushing inward the aforesaid pin $b$ by a cartridge-case or other readily-accessible implement. In order to assist in keeping the connected parts firmly together, the position of the forward end of the recoil-spring A' relatively to the bracket $A^5$ is such that said spring will be somewhat compressed by the pressure of the lug thereon due to the pushing together of the butt and stock in the act of connecting these parts. The recoil-spring will therefore exert a certain amount of forward pressure which will prevent any looseness existing between the said butt and stock.

For the purpose of reducing the amplitude of the recoil movement of the barrel when the firearm is to be used as an ordinary magazine-rifle the barrel is provided with a ring $a^{11}$, Fig. 20, fitted into a circumferential groove in said barrel. This ring has a lug $a^{12}$ and a thumb-piece $a^{13}$. By turning said ring into a position in which the lug is angularly shifted into a position to come in front of a fixed abutment $a^{14}$ on the stock the extent of the recoil of the barrel will be limited by the distance existing between said lug and abutment. When the said ring is angularly shifted into a position to bring the lug to one side of the abutment, as shown in Fig. 20, the barrel will be free to recoil without impediment from the abutment and will consequently perform its full recoil movement, as is required when the firearm is to work automatically.

What I claim, and desire to secure by Letters Patent of the United States, is—

1. In an automatic firearm, the combination with the recoiling barrel, the recoil-spring, the breech-bolt, and the return-spring; of means for locking the barrel after it and the bolt have recoiled, means for unlocking the bolt from the barrel and permitting it to continue its rearward movement independently of the barrel and extract the empty cartridge-case, means for locking the bolt in its retracted position and releasing the barrel, means for enabling the barrel to eject the extracted cartridge-case as said barrel advances to its forward position, means for enabling the barrel to release the bolt as said barrel advances, and means whereby the bolt in moving forward to close the breech introduces a fresh cartridge into the barrel substantially as described.

2. In an automatic firearm, the combination with the recoiling barrel, the recoil-spring, the breech-bolt and the return-spring; of a non-recoiling spring-controlled catch, means whereby the barrel in completing its recoil movement will be engaged and held by said catch, means whereby the breech-bolt in completing its independent rearward movement will disengage said catch from the barrel and itself become engaged and held by said catch, and means whereby the barrel in completing its forward movement disengages the catch from the bolt to permit the latter to advance and close the breech substantially as described.

3. In an automatic firearm, the combination with the recoiling barrel, the recoil-spring, the breech-bolt, and the return-spring; of a non-recoiling spring-controlled catch provided with three projections, one of which coöperates with the barrel in its recoil in order to restrain its return, another of which coöperates with the breech-bolt in order to liberate the barrel and restrain the return of the bolt, and the other of which coöperates with the barrel to release the bolt as the said barrel completes its forward movement substantially as described.

4. In an automatic firearm, the combination with the recoiling barrel, of means for enabling the amplitude of the recoil movement of the barrel to be limited when the firearm is to be used as an ordinary magazine-rifle substantially as described.

5. In an automatic firearm, the combination with the recoiling barrel of a non-recoiling stop-piece, and a stop-piece angularly displaceable relative to the axis and the barrel and which is movable with the barrel and adapted to hit or miss said non-recoiling stop-piece in accordance with its angular adjustment for the purpose specified.

6. In an automatic firearm, the combination with the stock carrying the recoiling parts of the mechanism and the butt carrying the non-recoiling parts of said mechanism, of a transversely-movable spring-pin for readily separating and reconnecting the said stock and butt for the purpose specified.

7. In an automatic firearm, the combination with the detachable stock and butt, of a transversely-movable spring-pin carried by the stock and adapted to engage with apertures in the butt, an inclined head on said spring-pin for enabling the butt to depress the spring-pin in the act of bringing said butt and stock together, and means whereby the recoil-spring is slightly compressed during such bringing together of the stock and butt substantially as described.

8. In an automatic firearm, the combination with the trigger, of a spring-controlled lever having one fulcrum near its middle and another near its forward end, and means whereby the lever will turn about its forward fulcrum during the first part of the trigger's movement and will turn about its middle fulcrum during the last part of the trigger's movement for the purpose specified.

9. In an automatic firearm, the combination with the trigger, of a spring-controlled lever having a fulcrum-pin near its middle and another near its forward end, the said middle fulcrum-pin extending through an elongated opening in the lever for enabling lost motion to take place at this point during the first part of the trigger's movement for the purpose specified.

In testimony whereof I have hereunto set my hand, in presence of two subscribing witnesses, this 27th day of June, 1905.

RUDOLF HENRIK KJELLMAN.

Witnesses:
FRITZ LEBAHN,
GUST. MOBERY.